United States Patent
Berg

(10) Patent No.: US 6,944,307 B2
(45) Date of Patent: Sep. 13, 2005

(54) MICROPHONE/EARPIECE DEVICE FOR A MOBILE TELEPHONE, TELEPHONE EXCHANGE OR THE LIKE

(75) Inventor: Richard Steenfeldt Berg, Oslo (NO)

(73) Assignee: Metafax AS, Oslo (NO)

( * ) Notice: Subject to any disclaimer, the term of this patent is extended or adjusted under 35 U.S.C. 154(b) by 0 days.

(21) Appl. No.: 10/415,707

(22) PCT Filed: Oct. 30, 2001

(86) PCT No.: PCT/NO01/00430

§ 371 (c)(1),
(2), (4) Date: Sep. 9, 2003

(87) PCT Pub. No.: WO02/01985

PCT Pub. Date: Jan. 10, 2002

(65) Prior Publication Data

US 2004/0052389 A1 Mar. 18, 2004

(30) Foreign Application Priority Data

Nov. 1, 2000 (NO) .......................... 20005512

(51) Int. Cl.⁷ .............................................. H04R 25/00
(52) U.S. Cl. ................... 381/150; 455/575.2; 181/135; 381/361; 381/362; 381/367; 381/375; 381/380; 381/374
(58) Field of Search ................................ 381/322, 328, 381/329, 330, 361, 362, 367, 371, 374, 380, 382, 390, 395, 355, 363, 364; 455/575.2; 181/130, 135

(56) References Cited

U.S. PATENT DOCUMENTS

| | | | | |
|---|---|---|---|---|
| 1,753,817 A | * | 4/1930 | Aber | 181/130 |
| 2,312,534 A | * | 3/1943 | Flene | 181/135 |
| 3,440,365 A | * | 4/1969 | Hazell et al. | 379/430 |
| 4,720,857 A | * | 1/1988 | Burris et al. | 379/430 |
| 5,048,090 A | * | 9/1991 | Geers | 381/328 |
| 5,298,692 A | * | 3/1994 | Ikeda et al. | 181/135 |
| 5,450,496 A | * | 9/1995 | Burris et al. | 381/375 |
| 5,659,156 A | | 8/1997 | Mauney et al. | |
| 5,799,097 A | * | 8/1998 | Lo | 381/385 |
| 5,943,627 A | | 8/1999 | Kim et al. | |
| 6,021,207 A | * | 2/2000 | Puthuff et al. | 381/330 |
| 6,122,388 A | | 9/2000 | Feldman | |
| 6,625,293 B1 | * | 9/2003 | Nageno et al. | 381/362 |
| 6,688,421 B2 | * | 2/2004 | Dyer et al. | 181/130 |

* cited by examiner

*Primary Examiner*—Curtis Kuntz
*Assistant Examiner*—Dionne Harvey
(74) *Attorney, Agent, or Firm*—Senniger Powers

(57) ABSTRACT

The invention relates to a device (1) constructed as portable hook-on frame (2, 3, 4,) with folding work tops or panels (5, 6, 7) and is composed of a basic frame (2) with a telescopic suspension frame (3) with suspension hooks (4), in which out of the basic frame (2) nearly the bottom side a hinging foldable work top (5) and nearby the upper side a hinging expandable U-shaped document holder frame (6) with plate (7) is mounted, in which the whole is especially useable for technicians, whom execute work on measurement and control cabinets and such.

5 Claims, 1 Drawing Sheet

MICROPHONE/EARPIECE DEVICE FOR A MOBILE TELEPHONE, TELEPHONE EXCHANGE OR THE LIKE

The present invention regards a device by wireless transmission between a microphone/earpiece and a mobile telephone, telephone, switchboard or similar as stated in the preamble of claim 1.

Microphone/earpiece combinations that are in wireless communication with telephones, switchboards etc. are known. However, such known devices are generally made with a bow for the earpiece and a microphone connected to this bow. Such devices are unsuitable for use with portable appliances, as the device, when not in use, should be shaped so as to fit easily into a pocket, bag or similar storage space.

As such it will be practical for the earpiece and the microphone to be integrated into one unit, to allow it to be placed in the ear in a simple manner, while fitting the ear in a comfortable and stable manner. There are currently hearing aids in existence that are carried on the ear, so-called earplug devices. However these do not favour mass production, as they must be adapted to each user separately in order to be stable and comfortable to use. This is due in particular to the fact that the ear opening into which the plug is to be inserted, differs from person to person. The external ear also differs from person to person, but these differences are not so great. This means that by using the external shape of the ear to attach an ear piece, two to three different sizes would be enough to cover these differences.

Furthermore, an ear plug will block the auditory canal and feel uncomfortable to the user. In addition, the natural production of wax in the ear will not escape, thus necessitating regular rising of the ear.

Ear pieces for walkmen etc. are known, which make use only of the outer part of the ear for fastening; however these have a circular shape and make use only of the lower part of the outer cavity of an ear for fastening, and small differences in ear size will cause them not to fit particularly well.

The object of the present invention is to avoid these drawbacks while providing stable and comfortable support of an earpiece with a microphone, this being provided by means of a device of the type mentioned by way of introduction, the characteristics of which appear from claim 1. Further characteristics of the invention appear from the remaining, dependent claims.

The form of the earpiece allows the auditory canal to remain open to the surroundings to a certain degree, which provides better comfort than a unit that blocks or closes off the auditory canal.

In the following, the present invention will be described in greater detail with reference to the drawings, in which.

Figure 1:
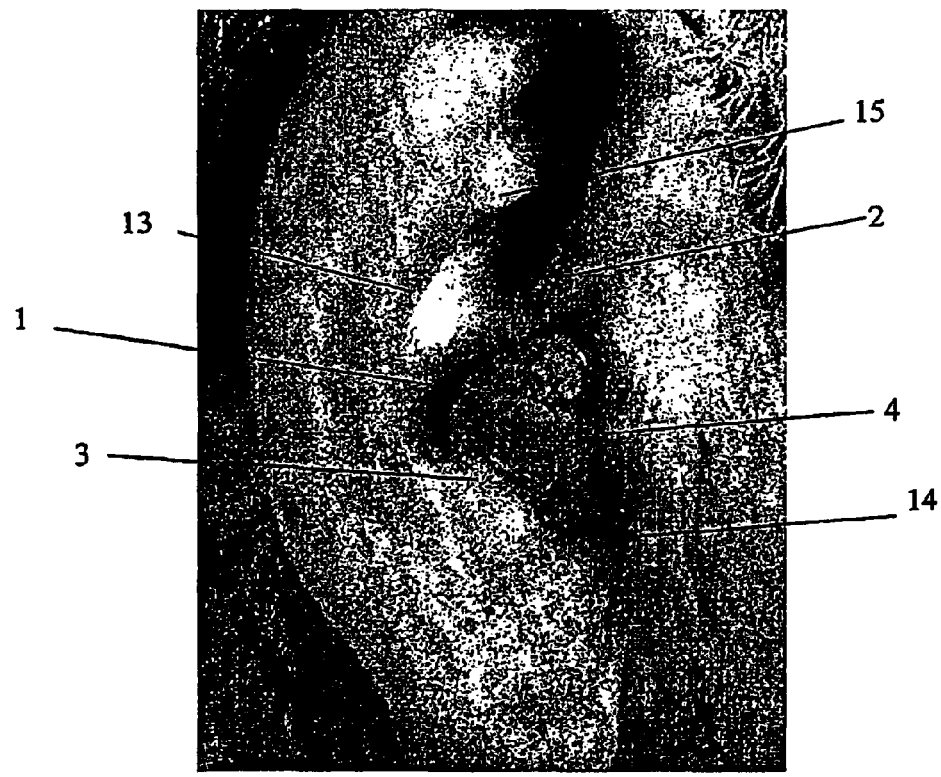
FIG. 1 shows an ear with a common, known earplug for hearing aids.

FIG. 1 shows a known earplug 1 for a hearing aid. As is apparent from the figure, the outer periphery of the earplug is held in the ear by the outer parts of the ear such as the lower part of the antihelix 13, antitragus 3 and tragus 4 of the ear, abutting intertragic notch 14. The earplug 1 is further held by the hearing unit having a plug that extends into the interior of the ear, with the previously mentioned drawbacks.

By the present invention, a larger part of the external ear is utilised, thus achieving higher stability while providing more comfort to the user than the previously known solutions. The present invention also utilises the upper part of the antihelix 13 and the cavity covered by the lower node 15 of the antihelix and the flap 2 covering said cavity by the outer part of the ear adjacent to the head.

Figure 2:
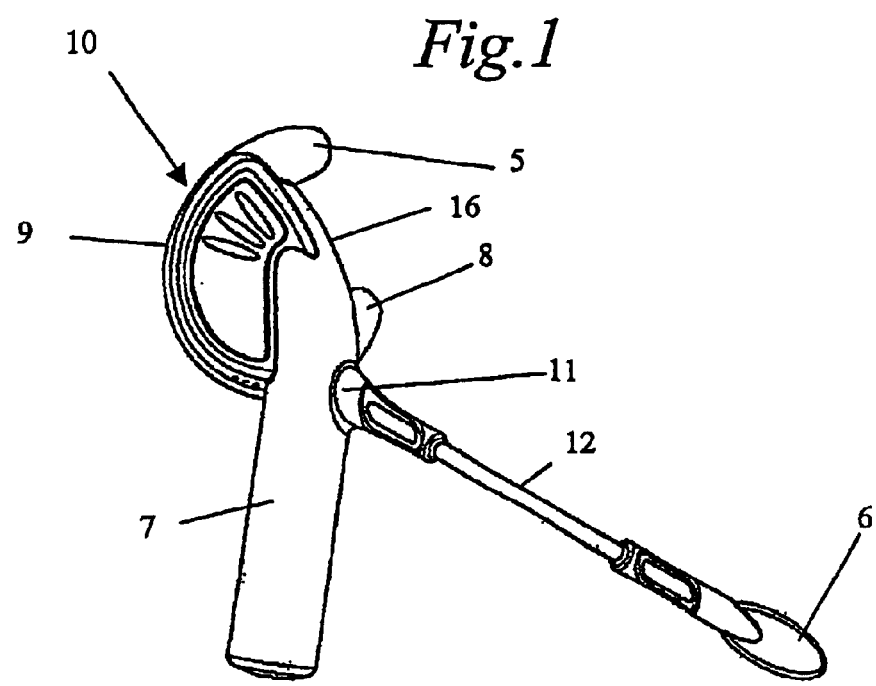
FIG. 2 shows an earpiece according to the present invention with a microphone rod.

The earpiece 10 according to the present invention is shown schematically in FIG. 2, with a microphone 6 and a microphone rod 12 connected to the earpiece 10 at the junction point 11. The microphone rod contains the connection between the microphone 6 and the transmitter/receiver arranged in the earpiece 10. The power supply for the transmitter/receiver is also disposed in the earpiece, in the lower part 7 of the earpiece 10 in the form of a rechargeable battery, e.g. a miniature penlight cell that, by virtue of its shape and weight leads to a low centre of gravity relative to the rotational axis formed at the landing point in the lower part of the ear cavity (by intertragic notch 14). This helps increase the dynamic stability of the earpiece 10 when the user is in motion. If the centre of gravity is any higher, any centripetal forces caused by quick movements on the user's behalf would cause the earpiece 10 to be pulled out of position from above. The antenna of the wireless part may be positioned e.g. in the microphone rod.

The earpiece 10 is C-shaped, the curve 9 of the outer C corresponding to the antihelix 13 of the ear and having a sloping surface, so that the C follows the inner part of the antihelix 13, with the lower part of the C being located partly underneath the antitragus 3 of the ear. The battery part 7, is laying, projects down from the C while providing a guide and a weight for the correct positioning of the earpiece 10 by more or less lying in the intertragic notch 14 of the ear, and the lower part 8 of the C projects into the cavity formed below the tragus 4 of the ear. The upper part of the C projects into the cavity covered by the lower node 15 of the antihelix and underneath the flap 2 covering the lower part of said cavity.

By use of the earpiece 10, an opening is formed between the outer periphery 16 of the earpiece 10 and the wall of the ear. This means that the ends 5 and 8 of the C project out from the casing of the earpiece 10. Likewise, the part of the earpiece 10 containing the hearing element is retracted slightly relative to the C-shaped part, ensuring that the hearing element does not abut the auditory canal directly, allowing the formation of an opening between the auditory canal and the surroundings.

What is claimed is:

1. An earpiece for wireless communication with a remote unit, said earpiece (10) being configured to be inserted in the external ear of a person and kept self supported therein, comprising a casing, said casing having a transmitter and a receiver, an antenna, a microphone (6) and a battery (7), characterized in:

first means for allowing said casing to fit snugly into the external ear of generally any person, independent of the size and shape of the persons ear, in a natural, comfortable and secured position, second means for effectively acting as a stabilizing strut for the earpiece (10) casing and keeping it in a stable position in the outer ear even during heavy movements of the wearing persons head, partly by lowering the earpiece center of gravity and pressing down toward a lower part of the ear, partly by counteracting any outward tilting movement of said casing, and third means for allowing a sufficient space between the earpiece casing and the auditory canal of the ear, for comfort, for air to circulate and for acoustical reasons, said first means being configured to match the inner edge of the antihelix (13) of the ear, so that the earpiece (10) can be carried in a comfortable and natural position in the external ear, a position where an upper portion is kept in place underneath the ear flap (2) covering the region in front of the cymba conchea of the ear, below its inferior antihelix crus (15), and where at the same time a lower portion is kept in place underneath the tragus (4) covering the ear's auditory canal, the matching configuration of said first means being generally effective due to a C-shaped portion that decrementally decreases its radius from its first, upper end (5) to its lower end (8), said C-shaped portion constituting an inner part of said casing, the distance between said portion ends (5, 8) being approximately equal to the distance between the person's ear flap (2) and tragus (4), thereby giving the earpiece a natural, comfortable and secured position that is fairly independent of the size and shape of the ear, said second means comprising a lower part (7) extending downwardly from the casing so as to pass through the intertragic notch (14) of the ear during the earpiece use, and eccentrically in relation to an approximate center of the C-shaped bead, and said lower part (7) further comprising the earpiece power supply including a battery so as to effectively lower the earpiece center of gravity and press down toward the antitragus (3) of the ear and at the same time providing 1) a forward or rearward acting momentum due to its eccentricity so as to push the lower or upper end of the C-shaped portion respectively inward under the tragus (4) or ea flap (2), and 2) counteracting any casing tilting-out tendency from the ear, in that said lower part being incorporated tightly in the casing, running parallel tightly along the cheek below the ear.

2. An earpiece according to claim 2, characterized in that a central portion of the casing is retracted relative to a peripheral portion that constitutes the C-shaped portion, in the direction toward the outer side of the casing, so as to keep a distance to the cavum conchae of the ear for air to pass.

3. An earpiece according to claim 1, characterized in that the portion ends (5, 8) are rounded in an expanded manner so as to form slim protruding end balls, in order to give the earpiece wearing person a comfortable support under her/his ear flap (2) and tragus (4), respectively.

4. An earpiece according to claim 1, characterized in that the casing is retracted a distance backwardly from the C-shaped portion ends (5, 8), so as to form an opening therebetween for air to pass.

5. An earpiece according to claim 1, characterized in that the upper and lower portion ends (5, 8) are protruding forwardly in relation to an outer front periphery (16) of the casing in the region between said portion ends.

* * * * *

UNITED STATES PATENT AND TRADEMARK OFFICE
CERTIFICATE OF CORRECTION

PATENT NO. : 6,944,307 B2
DATED : September 13, 2005
INVENTOR(S) : Richard Steenfeldt Berg It is certified that error appears in the above-identified patent and that said Letters Patent is hereby corrected as shown below:

<u>Title page,</u>
Item [57], ABSTRACT, should read
-- Device by remote wireless transmission between a microphone/earpiece and a mobile telephone, telephone, exchange or the like where the ear-piece (10) is formed as a large C and the distance between the ends of the C approximate equal the distance between a firts cavity formed under the tragus (4) of the ear and a second cavity covered by the lower node (15) of the antihelex (13) of the ear, and as the upper part of the C is protruding into the second cavity under a lap (2) covering the lower part of the second cavity. The earpiece unit comprises a transmitter/receiver, antenna, microphone (6) and a battery (7). The microphone (6) is connected to the earpiece (10) via a microphone rod (12) that also contains the antenna of the transmitter/receiver. --.

Signed and Sealed this

Twenty-first Day of March, 2006

JON W. DUDAS
*Director of the United States Patent and Trademark Office*